United States Patent [19]

Stillions

[11] Patent Number: 4,585,027
[45] Date of Patent: Apr. 29, 1986

[54] SELF-CYCLING WATER CONTROL

[76] Inventor: Fredrick K. Stillions, 765 N. Gibbs, Pomona, Calif. 91767

[21] Appl. No.: 614,537

[22] Filed: May 29, 1984

[51] Int. Cl.[4] .............................................. F16K 31/00
[52] U.S. Cl. ............................................... 137/624.11
[58] Field of Search ...................... 137/624.14, 624.11, 137/404

[56] References Cited

U.S. PATENT DOCUMENTS

| 1,822,901 | 9/1931 | De Lacy | 137/624.14 |
| 3,045,699 | 7/1962 | Childers | 137/624.14 |
| 3,078,866 | 2/1963 | Crow | 137/624.14 X |

Primary Examiner—Alan Cohan
Attorney, Agent, or Firm—Boniard I. Brown

[57] ABSTRACT

The flow of water to an irrigation device, animal watering trough or other similar structure is controlled by a main valve which is operated by a water actuated mechanism. The water actuated mechanism includes an actuation container which is restrained to vertical motions and whose vertical motions are operatively connected to the main water valve. An off-time valve adjustably meters pressurized water into the container for controllable but very slow filling. When the container attains a predetermined weight, it moves downwardly against an upward acting force applied by the buoyancy of a surrounding fluid, bias means, counterbalance means, magnetic attraction or the like, moving the main valve open and allowing relatively large flows. The actuation container is latched in this valve opening position by suitable means such as contacting magnets. A venturi device connected to the container through an on-time valve is provided in the flow channel downstream from the main water valve. The on-time valve is adjustably meters water out of the container while water is flowing until the upward force on the container can no longer be resisted by the magnets and the weight of the remaining water, at which point the container moves upwardly closing the main valve which stops flow through the venturi device and allows the container to refill for another cycle.

14 Claims, 4 Drawing Figures

U.S. Patent    Apr. 29, 1986    4,585,027
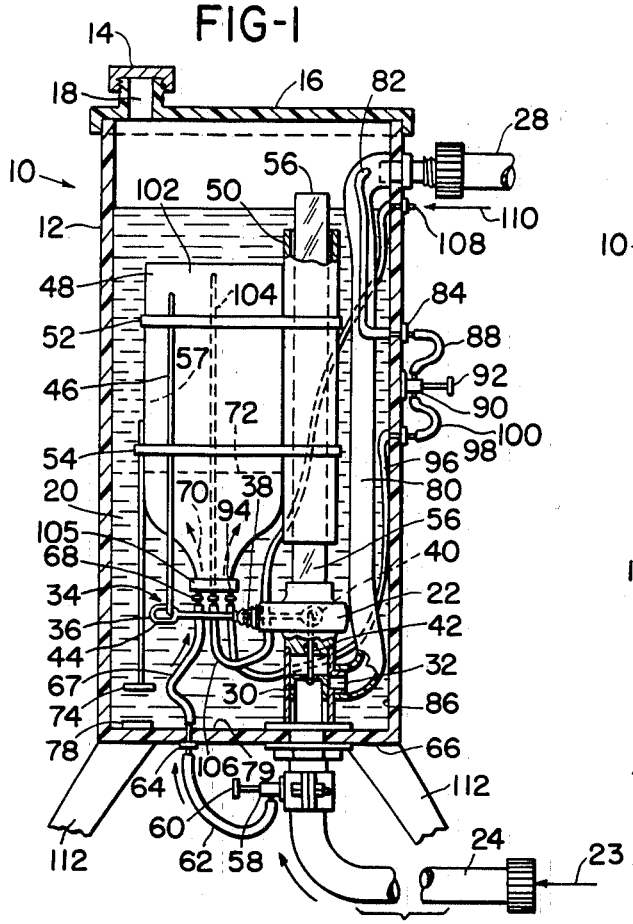
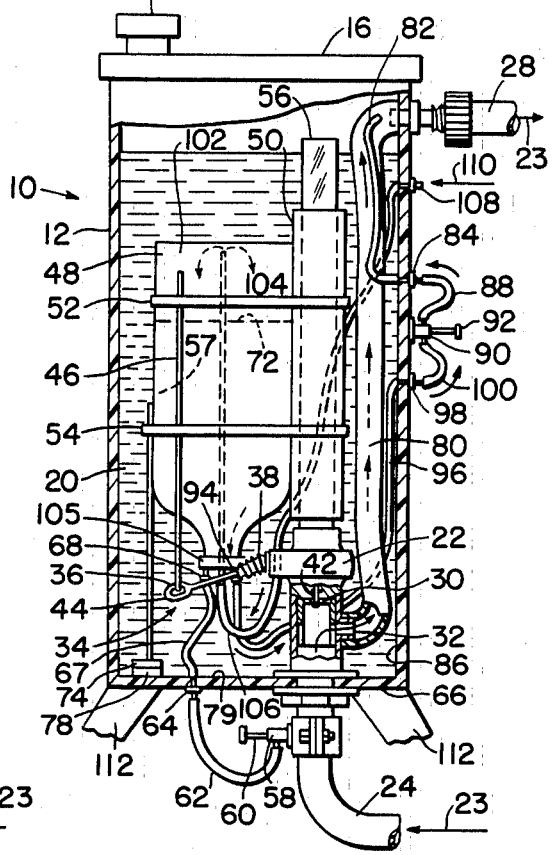
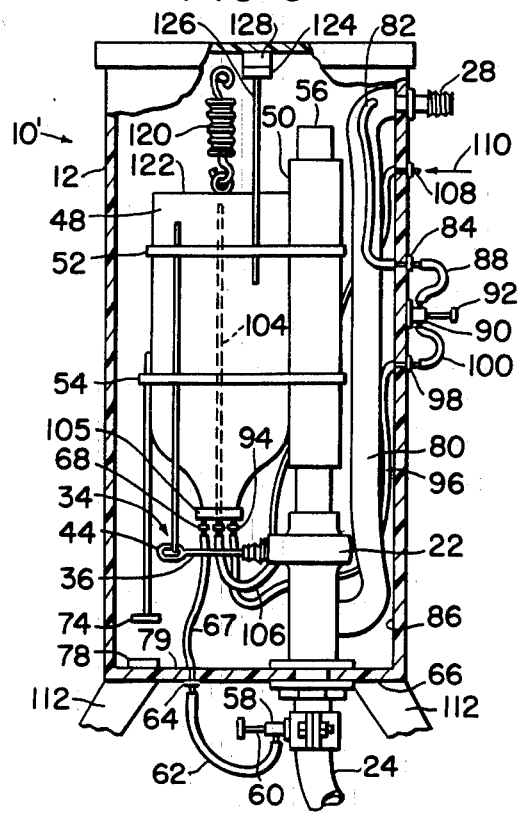
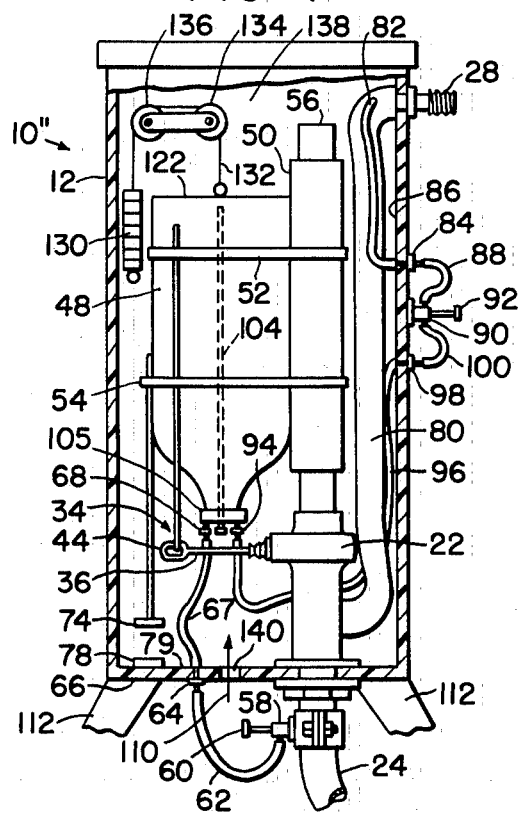

SELF-CYCLING WATER CONTROL

BACKGROUND OF THE INVENTION

One important element in maintaining plant growth, such as lawns, is the establishment of a consistent watering schedule. Too often, watering schedules are never established and the plants die because someone forgot to turn on the irrigation devices. For homeowners, vacations and business trips can make consistent watering schedules impossible. The resultant sporadic or catchup watering often proves ineffective, wasteful and may drown the plants or allow fungus, insects or other destructive elements to attack the plants.

In the urban environment, lawn watering is usually the most critical irrigational task faced by a homeowner. Electronically actuated sprinkler systems presently are used to compensate for human error factor in maintaining a well watered lawn. Unfortunately, these energy consuming systems are very difficult and expensive to install and hence are owned only by the most discerning homeowner. In an effort to place such systems within the economic reach of a larger number of homeowners, a battery-operated actuation system that waters lawns at timed intervals recently has been introduced. Although this system eliminates the need for running long lengths of electrical wiring, the batteries must be periodically changed and the total cost is still prohibitive to a large number of homeowners. Therefore, there has been a need for a device which can controllably and periodically switch lawn sprinklers and the like on-and-off, which requires no input power other than the pressurized water used for the irrigation itself, and which requires no expensive components or complex installation.

BRIEF DESCRIPTION OF THE PRESENT INVENTION

The present self-cycling water control device includes a body having an actuation container herein. The actuation container is restrained to move vertically between two positions, an upper position which maintains a connected main water control valve in a closed condition and a lower position which maintains the main water control valve in an open position. The main water control valve is connected between a pressurized water source and lawn sprinklers or other irrigation or watering devices and therefor controls the irrigation operation. Forces tending to maintain the actuation container in its lower position are enhanced by coupling magnets or other type latching devices which require that a predetermined amount of net upward force be applied to the actuation container before it moves upwardly. The movement of the actuation container is controlled by two valves, an off-time valve and an on-time valve. The off-time valve meters pressurized water from the source into the actuation container usually at a very slow rate so that the container gradually gets heavier over a period which may extend to days. When the off-time control valve has allowed a predetermined weight of water to flow into the actuation container, the weight of the water overcomes upward forces on the container and it lowers opening the main water control valve. The coupling magnets engage and maintain the lower position until a predetermined weight of water is removed from the container. This is accomplished by a connection from the container through an on-time control valve to an area in the flow downstream from the main control valve where the speed of flow reduces the static pressure at the connection below atmosphere pressure. The actuation container is vented to the atmosphere at a location above the level at which water will ever be maintained so that the flows into and out of the container are unaffected by what would otherwise be pressure conditions therewithin. By adjusting the on-time control valve, the amount of time required to empty the actuation container to a predetermined weight sufficient to disengage the magnets and snap the main control valve closed, can be adjusted from seconds to hours.

The upward forces acting to counteract the weight of water within the actuation container can be provided by, springs, counterbalances, or the buoyancy of a surrounding fluid in addition to contacting magnets.

It is therefore a principal object to the present invention to provide a cycling valve which can be easily adjusted by a homeowner to the homeowner's particular requirements which uses no power other than pressurized water which the valve is meant to control.

Another object is to provide a cycling irrigation system which uses no expensive components and has no need for connection to electric power.

Another object is to provide a cycling valve for irrigation systems which can be constructed from readily available components.

Another object is to provide an automatic, adjustable, on/off cycling water valve whose initial cost and installation is low enough to be borne easily by a normal homeowner.

These and other objects and advantages of the present invention will be come apparent to those skilled in the art after considering the following detailed specification together with the accompanying drawing wherein:

BRIEF DESCRIPTION OF THE DRAWING

FIG. 1 is a partial cross-sectional view of a preferred embodiment of the present invention in a condition blocking flow from a source of pressurized water to an irrigation system;

FIG. 2 is a cross-sectional view of the device of FIG. 1 in its open condition allowing flow to an irrigation system;

FIG. 3 is a cross-sectional view of a modified embodiment of the device of FIGS. 1 and 2 utilizing a spring and magnets rather than buoyancy to provide upward actuation force; and FIG. 4 is a cross-sectional view of a device similar to those of FIGS. 1, 2 and 3 utilizing a weight counterbalance to provide upward actuation force.

DETAILED DESCRIPTION OF THE SHOWN EMBODIMENTS

Referring to the drawing more particularly by reference numbers, number 10 in FIG. 1 refers to a valve device constructed according to the present invention. The device 10 includes a tank 12 having a removable cap 14 at its top 16. The cap 14 closes a passageway 18 through which the tank 12 is at least partially filled with a fluid 20 of suitable density and preferably anti-freezing characteristics.

The device 10 also includes a main control valve 22 which alternately restricts and opens flow of pressurized water 23 from an inlet 24 to an outlet 28. The valve 22 may be of any suitable on/off type which can be actuated with minimal force, such for example as is shown in FIGS. 1 and 2, a slide valve having a slide 30 that moves adjacent a port 32 so that when the slide 30 is in the position shown in FIG. 1, flow of the pressurized water 23 from the inlet 24 to the outlet 28 is blocked and when in the position shown in FIG. 2 such flow is allowed. The slide 30 is moved by a mechanism 34 including an actuation arm 36 which is movable in a pivot 38 and whose inner end 40 is connected by a rod 42 to the slide 30. The outer end 44 of the actuation arm 36 is connected by another rod 46 to a actuation container 48 which when configured as in FIGS. 1 and 2 acts as a float. The actuation container 48 is restricted to vertical movement by being attached to suitable structures. These can include a channel 50 connected to the container 48 by straps 52 and 54. The channel 50 slides on a rectangular, vertically extending column 56 within the tank 12.

When the interior 57 of the actuation container 48 is relatively devoid of water, the container 48 tends to float in the fluid 20 and maintain the position shown in FIG. 1 with the main control valve 22 closed. The interior 57 is connected to the pressurized water 23 by means of an off-time control valve 58 which may be a simple needle valve, as shown. Adjustment of the valve 58 by twisting its needle 60, allows a very small quantity of water to flow from the inlet 24 through connecting hose 62, a fitting 64 piercing the bottom 66 of the tank 12, a second hose 67 and a second fitting 68. This small flow quantity 70 gradually increases the amount of water 72 within the actuation container 48. When a sufficient quantity of water 72 has accumulated within the actuation container 48, its weight causes the container 48 to lose its buoyancy and sink as shown in FIG. 2. This causes the rod 46 to actuate the main control valve 22 open. At the same time, a downwardly facing magnet 74 attached to the actuation container 48 by a rod 76 engages a magnetizable member 78 mounted at the bottom 79 of the tank 12 to maintain the container 48 in its lower position until a predetermined amount of buoyancy has been returned thereto.

As shown in FIG. 2, when the main control valve 22 is actuated to the open position, pressurized water 23 flows from the inlet 24 through the valve 22 to the outlet 28. Suitable hose or tubing 80 provides the flow path from the valve 22 to the outlet 28. A small hose 82 is connected along the tubing 80 in a location so that the pressure of water rushing therepast is below atmospheric pressure. The hose 82 is connected by means of a fitting 84 which pierces the side 86 of the tank 12 and another hose 88 to an on-time control valve 90. The valve 90 may be a needle valve, as shown. Its needle 92 is adjusted to vary the time it takes for water to be drawn out of the actuation container 48 through a fitting 94 in the bottom thereof, a hose 96, a fitting 98 to pierce the side 86 of the tank 12 and another hose 100 to the on-time control valve 90. By adjusting the valve 90, the time before the actuation container 48 regains enough buoyancy to forceably disconnect the magnet 74 from the material 78 can be varied as desired thereby providing a device 10 whose off-time and on-time can be independently controlled by the manipulation of the two valves 58 and 90.

The interior 57 of the actuation chamber 48 is vented at its upper end 102 by a tube 104 which extends upwardly thereto and through the bottom 105 to a vent hose 106 which provides a venting passageway by connection through a fitting 108 to atmospheric pressure 110 which actually forces water out through the valve 90 when there is flow in the tubing 80.

The device 10 may be portable including downwardly extending legs 112 connected to the tank 12 or such legs 112 may be dispensed with and the entire device 10 be buried in some convenient spot adjacent the area to be irrigated.

As shown in FIGS. 3 and 4 the device 10 also can be configured utilizing a tension spring 120 in substitution for the fluid 20 within the container 12. When this is done, the spring 120 is connected between the upper surface 122 of the actuation chamber 48 and the tank 12. In this embodiment 10', as the actuation container 48 fills up, it gradually overcomes the force exertable by the tension spring 120 until the magnet 74 engages the magnetizable member 78 to open the main control valve 22 and cause flow like in the device 10 of FIGS. 1 and 2. The flow thereafter causes the actuation container 48 to empty until the spring 120 can overcome the attractive force of the magnet 74 and the weight of the remaining water in which case the actuation container 48 snaps upwardly turning off the main control valve 22. A second upwardly facing magnet 124 may be connected by means of a rod 126 to the actuation container 48 for engagement with a second magnetizable member 128 located at the top 16 when the actuation container 48 is in its up position. This is to provide a snap action both upwardly and downwardly to assure that the main control valve 22 can not be partially actuated. The off-latch magnet 124 is also useful in embodiments like device 10 when the level of fluid 20 does not completely submerge the container 48 at all times. The forces generated in such an instance vary with vertical position as they do in embodiment 10'.

In the device 10" of FIG. 4, the spring 120 has been replaced by a counterbalance weight 130 which is connected to the top 122 of the actuator container 48 by means of a cable 132 which extends over a pair of direction reversing pulleys 134 and 136 connected to the side 138 of the tank 12. Since the counterbalance weight 130 acts with approximately the same force on the top 122 of the container 48, no matter what the position thereof, it acts more like the buoyant device 10 shown in FIGS. 1 and 2 when the container 48 is always fully submerged in the fluid 20 and therefore has less need for the off-latch magnet 124 shown in FIG. 3. Since the tank 12 of device 10" should be dry, it can be vented by a drain hole 140 through the bottom 79 and the hose 106 can be eliminated. Any water flow through the drain hole 140 indicates a leak within the tank 12 which can be repaired before catastrophic failure.

Thus there has been shown and described novel devices for adjustably cycling irrigation systems which fulfill all the objects and advantages sought therefore. Many changes, alterations, modifications and other uses and applications of the subject devices will become apparent to those skilled in the art after considering this specification together with the accompanying drawing. All such changes, alterations and modifications which do not depart from the spirit and scope of the invention are deemed to be covered by the invention which is limited only by the claims which follow.

What is claimed is:

1. A cycling, fluid control valve device including:
 fluid inlet means;
 fluid outlet means having a location therein where flow of fluid therethrough produces a first pressure;

a main control valve connected between said fluid inlet means and said fluid outlet means, said main control valve having:
an open position;
a closed position; and
mechanical means to change said main control valve between said open and closed positions;
an actuation container connected to said mechanical means so that vertical movement of said actuation container changes said main control valve between said open and closed positions, said actuation container having an internal pressure greater than said first pressure;
first metering valve means connected to provide a flow path from said fluid inlet means to said actuation container so that the fluid can fill the actuation container and increase its weight;
second metering valve means connected to provide a flow path from said fluid outlet means location where flow of fluid therethrough produces said first pressure to said actuation container so that the fluid is forced out of said actuation container by said internal pressure to decrease its weight; and
means to bias said actuation container upwardly having a force magnitude which can be overcome by the weight of a predetermined amount of fluid in said actuation container, whereby said first metering valve means control the time said main control valve is in its closed position and said second metering valve means control the time said main control valve is in its open position, said means to bias said actuation container upwardly including:
a tank having therein a fluid of predetermined density in which said actuation container is at least partially submerged.

2. The cycling, fluid control valve device of claim 1 wherein said actuation container has:
an upper position which maintains said main control valve in said closed position; and
a lower position which maintains said main control valve in said open position, said device further including:
means connected to said actuation container to releasably latch said actuation container in said lower position.

3. The cycling, fluid control valve device of claim 2 wherein said means connected to said actuation container to releasably latch said actuation container in said lower position include:
magnet means connected to said actuation container and said tank positioned to engage when said actuation container is in said lower position.

4. The cycling, fluid control valve device of claim 1 wherein said actuation container has:
an upper position which maintains said main control valve in said closed position; and
a lower position which maintains said main control valve in said open position, said device further including:
first latch means connected to said actuation container to releasably latch said actuation container in said lower position; and
second latch means connected to said actuation container to releasably latch said actuation container in said upper position.

5. The cycling, fluid control valve device of claim 4 wherein said first latch means connected to said actuation container to releasably latch said actuation container in said lower position include:
first magnet means connected to said actuation container and said tank positioned to engage when said actuation container is in said lower position, and wherein said second latch means connected to said actuation container to releasably latch said actuation container in said upper position include:
second magnet means connected to said actuation container and said tank positioned to engage when said actuation container is in said upper position.

6. The cycling, fluid control valve device of claim 1 wherein said actuation container has:
an upper interior portion; and
a lower interior portion, said device further including:
a vent passageway connecting said upper interior of said actuation container to the atmosphere so that said internal pressure is atmospheric pressure.

7. The cycling, fluid control valve device of claim 6 wherein said first metering valve means are connected to provide a flow path from said fluid inlet means to said lower portion of said actuation container, and said second metering valve means are connected to provide a flow path from said fluid outlet means location where flow of fluid therethrough produces said first pressure to said lower portion of said actuation container.

8. The cycling, fluid control valve device of claim 7 further including:
support means connected between said tank and said actuation container to restrict said actuation container to vertical motion.

9. A device for alternately connecting and disconnecting a source of pressurized water to an irrigation system including:
water inlet means;
water outlet means having:
a port therein where flow of water therethrough produces a first pressure which is less than atmospheric pressure;
a main water valve connected between said water inlet means and said water outlet means, said main water valve having:
an open position;
a closed position; and
mechanical means to change said main water valve between said open and closed positions;
an actuation container connected to said mechanical means so that vertical movement of said actuation container changes said main water valve between said open and closed positions, said actuation container having:
an upper interior portion;
a lower interior portion; and
an atmospheric vent to said upper interior portion;
first metering means connected to provide a restricted flow path from said water inlet means to said actuation container so that the water can fill the actuation container to slowly increase its weight;
second metering means connected to provide a restricted flow path from said water outlet means port so that the water is forced out of said actuation container thereby to decrease its weight when water is flowing in said water outlet means; and
means to bias said actuation container upwardly having a force of a magnitude which can be overcome by the weight of a predetermined amount of water in said actuation container, whereby said first metering means control the time said main water valve is in its closed position and said second metering means control the time said main water valve is in its open position; said means to bias said actuation container upwardly including:
  a tank having therein a fluid of predetermined density in which said actuation container is at least partially submerged, and wherein said actuation container has:
    an upper position which maintains said main control valve in said closed position; and
    a lower position which maintains said main control valve in said open position, said device further including:
  magnet means connected to said actuation container and said tank positioned to engage when said actuation container is in said lower position and thereby releasably latch said actuation container in said lower position.

10. A cycling, fluid control valve device including:
  fluid inlet means;
  fluid outlet means having a location therein where flow of fluid therethrough produces a first pressure;
  a main control valve connected between said fluid inlet means and said fluid outlet means, said main control valve having:
    an open position;
    a closed positon; and
    mechanical means to change said main control valve between said open and closed positions;
  an actuation container connected to said mechanical means so that vertical movement of said actuation container changes said main control valve between said open and closed positions, said actuation container having a internal pressure greater than said first pressure;
  first metering valve means connected to provide a flow path from said fluid inlet means to said actuation container so that the fluid can fill the actuation container and increase its weight;
  second metering valve means connected to provide a flow path from said fluid outlet means location where flow of fluid therethrough produces said first pressure to said actuation container so that the fluid is forced out of said actuation container by said internal pressure to decrease its weight;
  means to bias said actuation container upwardly having a force magnitude which can be overcome by the weight of a predetermined amount of fluid in said actuation container, whereby said first metering valve means control the time said main control valve is in its closed position and said second metering valve means control the time said main control valve is in its open position; and
  a body to which said fluid inlet means, said fluid outlet means, said main control valve, and said actuation container are operatively connected, said means to bias said actuation container upwardly including:
    spring means connected between said body and said actuation container, said actuation container having:
      an upper position which maintains said main control valve in said closed position; and
      a lower position which maintains said main control valve in said open position, said device further including:
    first latch means connected to said actuation container to releasably latch said actuation container in said lower position; and
    second latch means connected to said actuation container to releasably latch said actuation container in said upper position, said first latch means connected to said actuation container to releasably latch said actuation container in said lower position including:
      first magnet means connected to said actuation container and said body positioned to engage and latch when said actuation container is in said lower position, and said second latch means connected to said actuation container to releasably latch said actuation container in said upper position including:
      second magnet means connected to said actuation container and said body positioned to engage and latch when said actuation container is in said upper position.

11. A cycling, fluid control valve device including:
  fluid inlet means;
  fluid outlet means having a location therein where flow of fluid therethrough produces a first pressure;
  a main control valve connected between said fluid inlet means and said fluid outlet means, said main control valve having:
    an open position;
    a closed position; and
    mechanical means to change said main control valve between said open and closed positions;
  an actuation container connected to said mechanical means so that vertical movement of said actuation container changes said main control valve between said open and closed positions, said actuation container having a internal pressure greater than said first pressure;
  first metering valve means connected to provide a flow path from said fluid inlet means to said actuation container so that the fluid can fill the actuation container and increase its weight;
  second metering valve means connected to provide a flow path from said fluid outlet means location where flow of fluid therethrough produces said first pressure to said actuation container so that the fluid is forced out of said actuation container by said internal pressure to decrease its weight;
  means to bias said actuation container upwardly having a force magnitude which can be overcome by the weight of a predetermined amount of fluid in said actuation container, whereby said first metering valve means control the time said main control valve is in its closed position and said second metering valve means control the time said main control valve is in its open position; and
  a body to which said fluid inlet means, said fluid outlet means, said main control valve, and said actuation container are operatively connected, said means to bias said actuation container upwardly including:
    counterbalance means connected between said body and said actuation container, said actuation container having:

an upper position which maintains said main control valve in said closed position; and a lower position which maintains said main control valve in said open position, said device further including:

first latch means connected to said actuation container to releasably latch said actuation container in said lower position, said actuation container to releasably latch said actuation container in said lower position including:

magnet means connected to said actuation container and said body positioned to engage when said actuation container is in said lower position.

12. The cycling, fluid control valve device of claim 11 wherein said actuation container has:

an upper interior portion; and a lower interior portion, said device further including:

a vent path operatively connecting said upper interior of said actuation container to the atmosphere so that said internal pressure is atmospheric pressure, said first metering valve means being connected to provide a flow path from said fluid inlet means to said lower portion of said actuation container, and said second metering valve means being connected to provide a flow path from said fluid outlet means location where flow of fluid therethrough produces said first pressure to said lower portion of said actuation container.

13. A device for alternately connecting and disconnecting a source of pressurized water to an irrigation system including:

water inlet means;

water outlet means having:

a port therein where flow of water therethrough produces a first pressure which is less than atmospheric pressure;

a main water valve connected between said water inlet means and said water outlet means, said main water valve having:

an open position;

a closed position; and mechanical means to change said main water valve between said open and closed positions;

an actuation container connected to said mechanical means so that vertical movement of said actuation container changes said main water valve between said open and closed positions, said actuation container having:

an upper interior portion;

a lower interior portion; and an atmospheric vent to said upper interior portion;

first metering means connected to provide a restricted flow path from said water inlet means to said actuation container so that the water can fill the actuation container to slowly increase its weight;

second metering means connected to provide a restricted flow path from said water outlet means port so that the water is forced out of said actuation container thereby to decrease its weight when water is flowing in said water outlet means;

means to bias said actuation container upwardly having a force of a magnitude which can be overcome by the weight of a predetermined amount of water in said actuation container, whereby said first metering means control the time said main water valve is in its closed position and said second metering means control the time said main water valve is in its open position; and a body to which said water inlet means, said water outlet means, said main control valve, and said actuation container are operatively connected, said means to bias said actuation container upwardly including:

spring means connected between said body and said actuation container, and wherein said actuation container has:

an upper position which maintains said main control valve in said closed position; and a lower position which maintains said main control valve in said open position, said device further including:

first magnet means connected to said actuation container and said body positioned to engage when said actuation container is in said lower position to thereby releasably latch said actuation container in said lower position; and second magnet means connected to said actuation container and said body positioned to engage when said actuation container is in said upper position to thereby releasably latch said actuation container in said upper position.

14. A device for alternately connecting and disconnecting a source of pressurized water to an irrigation system including:

water inlet means;

water outlet means having:

a port therein where flow of water therethrough produces a first pressure which is less than atmospheric pressure;

a main water valve connected between said water inlet means and said water outlet means, said main water valve having:

an open position;

a closed position; and mechanical means to change said main water valve between said open and closed positions;

an actuation container connected to said mechanical means so that vertical movement of said actuation container changes said main water valve between said open and closed positions, said actuation container having:

an upper interior portion;

a lower interior portion; and an atmospheric vent to said upper interior portion;

first metering means connected to provide a restricted flow path from said water inlet means to said actuation container so that the water can fill the actuation container to slowly increase its weight;

second metering means connected to provide a restricted flow path from said water outlet means port so that the water is forced out of said actuation container thereby to decrease its weight when water is flowing in said water outlet means;

means to bias said actuation container upwardly having a force of a magnitude which can be overcome by the weight of a predetermined amount of water in said actuation container, whereby said first metering means control the time said main water valve is in its closed position and said second metering means control the time said main water valve is in its open position; and a body to which said water inlet means, said water outlet means, said main control valve, and said actuation container are operatively connected, said means to bias said actuation container upwardly including:

counterbalance means connected between said body and said actuation container, and wherein said actuation container has:

an upper position which maintains said main control valve in said closed position; and a lower position which maintains said main control valve in said open position, said device further including:

first magnet means connected to said actuation container and said body positioned to engage when said actuation container is in said lower position to thereby releasably latch said actuation container in said lower position.

* * * * *